(12) United States Patent
Shibasaki et al.

(10) Patent No.: US 11,257,626 B2
(45) Date of Patent: Feb. 22, 2022

(54) MULTI-LAYER CERAMIC CAPACITOR

(71) Applicant: TAIYO YUDEN CO., LTD., Tokyo (JP)

(72) Inventors: Ryuichi Shibasaki, Tokyo (JP); Makoto Sakata, Tokyo (JP); Nobuyuki Yamaguchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 56 days.

(21) Appl. No.: 16/744,731

(22) Filed: Jan. 16, 2020

(65) Prior Publication Data

US 2020/0234886 A1 Jul. 23, 2020

(30) Foreign Application Priority Data

Jan. 18, 2019 (JP) .............................. JP2019-006577

(51) Int. Cl.
| | | |
|---|---|---|
| *H01G 4/30* | (2006.01) | |
| *H01G 4/012* | (2006.01) | |
| *H01G 4/232* | (2006.01) | |
| *H01G 4/248* | (2006.01) | |
| *H01G 4/008* | (2006.01) | |
| *H01G 4/12* | (2006.01) | |

(52) U.S. Cl.
CPC ............... *H01G 4/30* (2013.01); *H01G 4/012* (2013.01); *H01G 4/232* (2013.01); *H01G 4/248* (2013.01); *H01G 4/0085* (2013.01); *H01G 4/1227* (2013.01)

(58) Field of Classification Search
CPC ........ H01G 4/30; H01G 4/012; H01G 4/1227; H01G 4/232; H01G 4/248; H01G 4/1209
USPC ......... 361/321.1, 321.2, 321.4, 321.5, 301.4, 361/311, 312
See application file for complete search history.

(56) References Cited

U.S. PATENT DOCUMENTS

| | | | |
|---|---|---|---|
| 2008/0084651 A1 | 4/2008 | Oguni et al. | |
| 2017/0345567 A1* | 11/2017 | Sakate | ................. H01G 4/1218 |

FOREIGN PATENT DOCUMENTS

JP 2007-013132 A 1/2007

* cited by examiner

*Primary Examiner* — Arun Ramaswamy
(74) *Attorney, Agent, or Firm* — Chen Yoshimura LLP (57) ABSTRACT

A multi-layer ceramic capacitor includes a ceramic body and external electrodes. The ceramic body includes ceramic layers laminated in a first direction, first and second internal electrodes between the ceramic layers, a facing portion in which the internal electrodes face in the first direction, and a cover that covers the facing portion in the first direction. The facing portion includes a first region including at least one element of manganese, a rare-earth element, or magnesium and having a flat distribution of a concentration of the element along the first direction, and a second region disposed between the cover and the first region and having an increasing concentration of the element from the first region toward the cover. The ceramic layers include a capacitance forming layer between the first and second internal electrodes, and a dummy layer between the first or second internal electrodes and across the first and second regions.

5 Claims, 7 Drawing Sheets

MULTI-LAYER CERAMIC CAPACITOR

BACKGROUND ART

The present disclosure relates to a multi-layer ceramic capacitor.

A multi-layer ceramic capacitor is configured such that a voltage can be applied to each of many ceramic layers laminated in the multi-layer ceramic capacitor. Such a multi-layer ceramic capacitor causes mechanical deformation (electrostriction) due to a piezoelectric effect in each ceramic layer to which the voltage is applied. In such a multi-layer ceramic capacitor, cracks are generated due to the electrostriction in some cases.

Japanese Patent Application Laid-open No. 2007-013132 discloses a multi-layer ceramic capacitor capable of suppressing generation of cracks due to electrostriction. This multi-layer ceramic capacitor includes a stress relaxation layer configured such that a voltage is not applied thereto. In such a multi-layer ceramic capacitor, internal stress is relaxed by the stress relaxation layer, which does not cause electrostriction, and thus cracks are less liable to be generated.

SUMMARY OF THE INVENTION

However, in the multi-layer ceramic capacitor described above, if the stress relaxation layer, which does not contribute to formation of a capacitance, is expanded so as to further relax the internal stress, the capacitance is liable to become insufficient as a whole. Therefore, in the multi-layer ceramic capacitor, there is a demand for a technique capable of effectively suppressing the generation of cracks without sacrificing the capacitance as much as possible.

In view of the circumstances as described above, it is desirable to provide a multi-layer ceramic capacitor that is less liable to generate cracks due to electrostriction.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multi-layer ceramic capacitor including a ceramic body, a first external electrode, and a second external electrode.

The ceramic body includes ceramic layers laminated in a first direction, first internal electrodes and second internal electrodes that are disposed between the ceramic layers, a facing portion in which the first internal electrodes and the second internal electrodes face in the first direction, a first end surface to which the first internal electrodes are drawn from the facing portion, a second end surface to which the second internal electrodes are drawn from the facing portion, and a cover that covers the facing portion in the first direction.

The first external electrode covers the first end surface.

The second external electrode covers the second end surface.

The facing portion includes a first region including at least one element among manganese, a rare-earth element, and magnesium, and having a flat distribution of a concentration of the at least one element along the first direction, and a second region disposed between the cover and the first region and having an increasing concentration of the at least one element from the first region toward the cover.

The ceramic layers include a capacitance forming layer sandwiched between the first internal electrode and the second internal electrode, and a dummy layer sandwiched between the first internal electrodes or between the second internal electrodes and extending across the first region and the second region.

In this configuration, the facing portion includes at least one element of manganese, a rare-earth element, or magnesium, which has an action of suppressing crystal growth. The facing portion includes the first region and the second region having different concentration distributions of the element so as to be capable of suitably suppressing the crystal growth by the element described above.

The inventors of this application found that cracks due to electrostriction are liable to be generated because of grain coarsening in the vicinity of the boundary between the first region and the second region of the facing portion. In this regard, in the configuration described above, the dummy layer to which no voltage is applied is disposed at the boundary. Thus, even if coarse crystal grains are generated in the vicinity of the boundary, cracks due to electrostriction are less liable to be generated.

A dimension of the dummy layer in the first direction may be larger than a dimension of the capacitance forming layer in the first direction.

A dimension of the dummy layer in the first direction may be 5 μm or more and 10 μm or less.

In those configurations, it is possible to suppress a decrease in capacitance due to the presence of the dummy layer and to more effectively obtain an effect produced by the dummy layer.

The cover may be provided in a pair, the pair of covers being disposed on both sides of the facing portion in the first direction.

The second region may be provided in a pair, each one of the pair of second regions being disposed between a corresponding one of the pair of covers and the first region.

The dummy layer may be provided in a pair, each one of the pair of dummy layers extending across the first region and a corresponding one of the pair of second regions.

It is possible to provide a multi-layer ceramic capacitor that is less liable to generate cracks due to electrostriction.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the invention as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-layer Ceramic Capacitor 10

Figure 1:
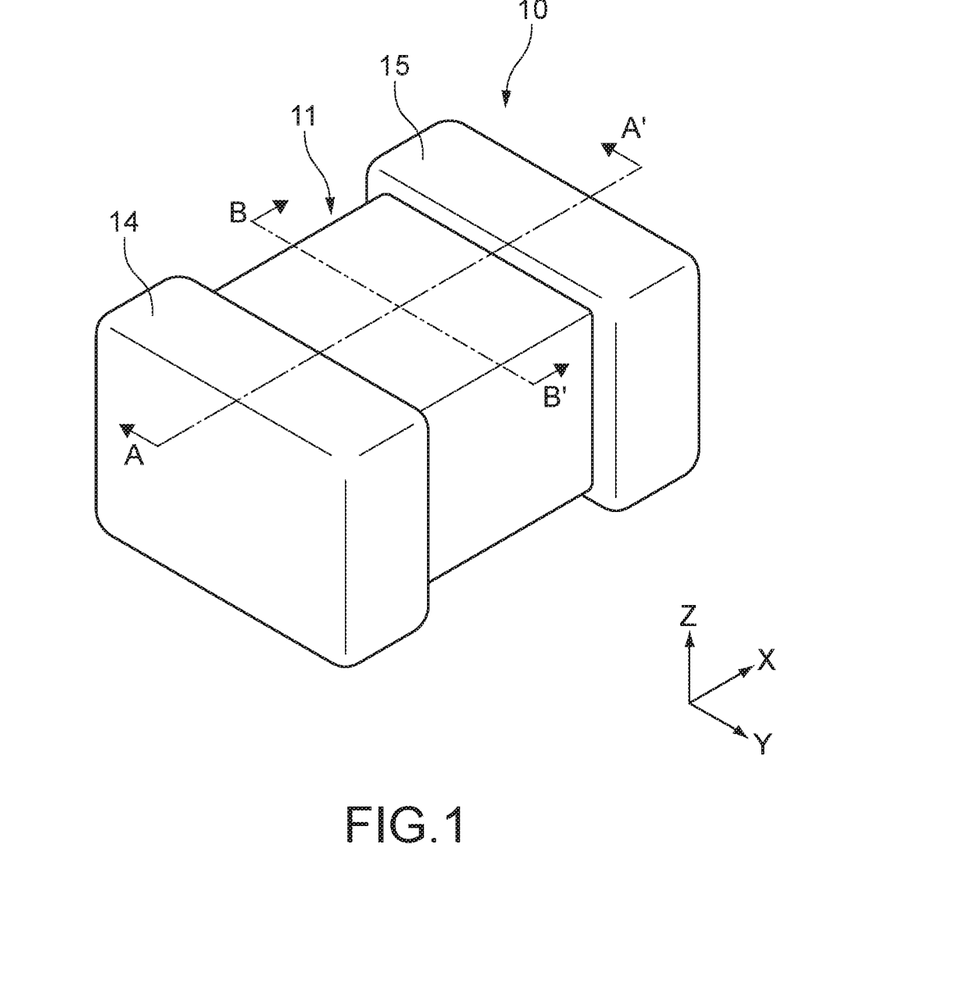
FIG. 1 is a perspective view of a multi-layer ceramic capacitor according to an embodiment of the present disclosure.
Figure 2:
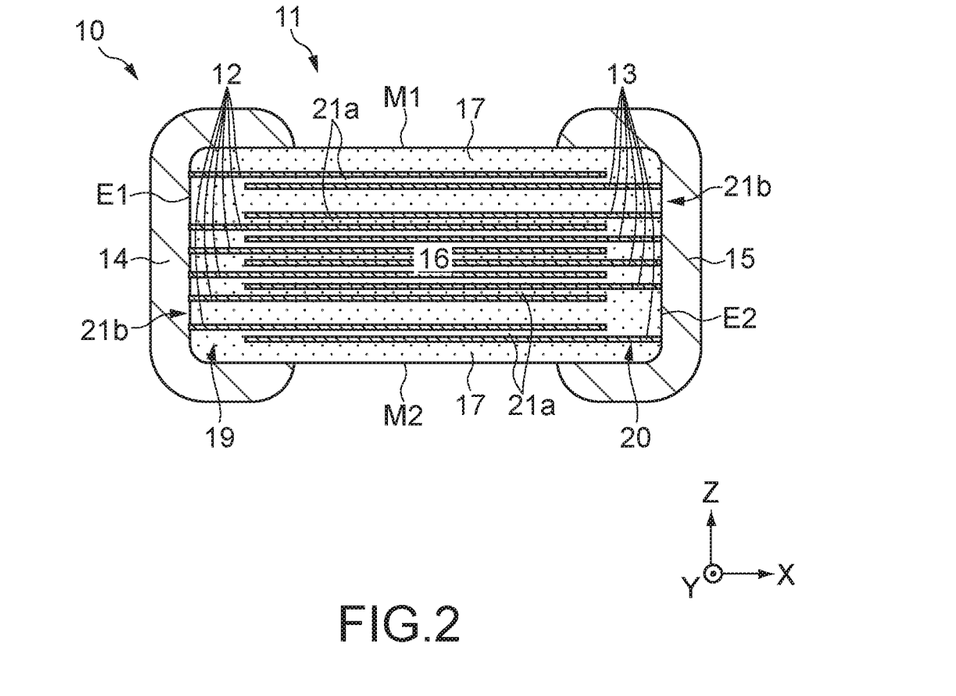
FIG. 2 is a cross-sectional view of the multi-layer ceramic capacitor taken along the A-A' line in FIG. 1.
Figure 3:
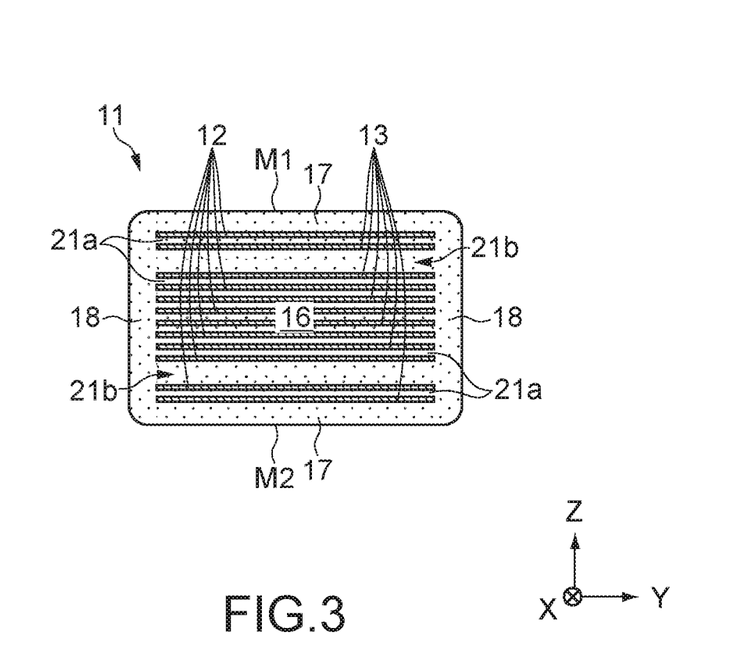
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 has two end surfaces E1 and E2 facing opposite ways along the X-axis, two main surfaces M1 and M2 facing opposite ways along the Z-axis, and two side surfaces facing opposite ways along the Y-axis. Ridges connecting the respective surfaces of the ceramic body 11 are chamfered.

It should be noted that the shape of the ceramic body 11 is not limited to the above shape. In other words, the ceramic body 11 does not need to have the rectangular parallelepiped shape as shown in FIGS. 1 to 3. For example, the surfaces of the ceramic body 11 may be curved surfaces, and the ceramic body 11 may be rounded as a whole.

The first external electrode 14 covers the end surface E1 of the ceramic body 11. The second external electrode 15 covers the end surface E2 of the ceramic body 11. The first and second external electrodes 14 and 15 extend to the four surfaces (both the main surfaces M1 and M2 and both the side surfaces) connected to both the end surfaces E1 and E2, respectively. With this configuration, both of the first and second external electrodes 14 and 15 have U-shaped cross sections parallel to the X-Z plane and to the X-Y plane.

The first and second external electrodes 14 and 15 are each formed of a good conductor of electricity and function as terminals of the multi-layer ceramic capacitor 10. Examples of the good conductor of electricity forming the first and second external electrodes 14 and 15 include a metal mainly containing nickel (Ni), copper (Cu), palladium (Pd), platinum (Pt), silver (Ag), gold (Au), or the like or an alloy of them.

Each of the first and second external electrodes 14 and 15 is not limited to have a particular configuration. For example, each of the first and second external electrodes 14 and 15 may have a single-layer structure or a multi-layer structure. Each of the first and second external electrodes 14 and 15, which has a multi-layer structure, may be formed to have a double-layer structure including a base film and a surface film or have a three-layer structure including a base film, an intermediate film, and a surface film, for example.

The ceramic body 11 has a laminated structure in which a plurality of sheet-like ceramic layers extending along the X-Y plane are laminated in the Z-axis direction. The ceramic body 11 includes a facing portion 16, covers 17, side margins 18, a first end margin 19, and a second end margin 20.

The facing portion 16 is disposed at the center of the ceramic body 11. The covers 17 are disposed on both sides of the facing portion 16 in the Z-axis direction. The side margins 18 are disposed on both sides of the facing portion 16 in the Y-axis direction. The covers 17 and the side margins 18 have main functions of protecting the facing portion 16 and ensuring insulation properties of the periphery of the facing portion 16.

The first end margin 19 and the second end margin 20 are disposed on both sides of the facing portion 16 in the X-axis direction. In other words, the first end margin 19 constitutes the end surface E1 and is disposed between the facing portion 16 and the first external electrode 14. The second end margin 20 constitutes the end surface E2 and is disposed between the facing portion 16 and the second external electrode 15.

The ceramic body 11 includes first internal electrodes 12 and second internal electrodes 13. The first and second internal electrodes 12 and 13 each have a sheet-like shape extending along the X-Y plane and are each disposed between ceramic layers. The first and second internal electrodes 12 and 13 face each other in the Z-axis direction in the facing portion 16. In other words, the facing portion 16 is configured as a multi-layer unit in which the first and second internal electrodes 12 and 13 overlap each other in the Z-axis direction.

As shown in FIG. 2, the first internal electrodes 12 are drawn from the facing portion 16 to the end surface E1 via the first end margin 19 and connected to the first external electrode 14. The second internal electrodes 13 are drawn from the facing portion 16 to the end surface E2 via the second end margin 20 and connected to the second external electrode 15.

Further, the first internal electrodes 12 are disposed with a gap from the second external electrode 15, the gap being formed by the second end margin 20, and are insulated from the second external electrode 15. The second internal electrodes 13 are disposed with a gap from the first external electrode 14, the gap being formed by the first end margin 19, and are insulated from the first external electrode 14.

The first and second internal electrodes 12 and 13 are each formed of an electrically conductive material and function as internal electrodes of the multi-layer ceramic capacitor 10. Examples of the electrically conductive material forming the first and second internal electrodes 12 and 13 include a metal material containing nickel (Ni), copper (Cu), palladium (Pd), platinum (Pt), silver (Ag), gold (Au), or an alloy of them.

The facing portion 16, the first end margin 19, and the second end margin 20 are favorably formed of dielectric ceramics having a high dielectric constant. Accordingly, in the multi-layer ceramic capacitor 10, the capacitance of each ceramic layer (capacitance forming layer 21a) between the first and second internal electrodes 12 and 13 facing each other in the facing portion 16 is increased, and thus a large capacitance is obtained as a whole.

More specifically, in the multi-layer ceramic capacitor 10, polycrystal of a barium titanate ($BaTiO_3$) based material, i.e., polycrystal having a Perovskite structure containing barium (Ba) and titanium (Ti) can be used for the dielectric ceramics having a high dielectric constant. This provides the multi-layer ceramic capacitor 10 with a large capacitance.

It should be noted that the dielectric ceramics may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium zirconate ($BaZrO_3$), titanium oxide ($TiO_2$), or the like.

It is also favorable to form the covers 17 and the side margins 18 using dielectric ceramics having a composition system similar to that of the facing portion 16, the first end margin 19, and the second end margin 20. This makes it difficult to cause internal stress resulting from a difference in physical property in the multi-layer ceramic capacitor 10, and thus high reliability is obtained.

In the ceramic body 11, the plurality of ceramic layers constituting the facing portion 16 includes capacitance forming layers 21a and dummy layers 21b. Among the plurality of ceramic layers constituting the facing portion 16, most of the ceramic layers are the capacitance forming layers 21a, and only a few ceramic layers are the dummy layers 21b.

The capacitance forming layer 21a is sandwiched between the first internal electrode 12 and the second internal electrode 13 in the facing portion 16. Thus, when a voltage is applied between the first external electrode 14 and the second external electrode 15, the voltage is applied to each capacitance forming layer 21a sandwiched between the first internal electrode 12 and the second internal electrode 13. With this configuration, the multi-layer ceramic capacitor 10 stores charge corresponding to the voltage applied between the first external electrode 14 and the second external electrode 15.

The dummy layer 21b is sandwiched between the first internal electrodes 12 or the second internal electrodes 13, which are sequentially disposed in the Z-axis direction in the facing portion 16. Thus, even if a voltage is applied between the first and second external electrodes 14 and 15, the voltage is not applied to the dummy layer 21b sandwiched between the first internal electrodes 12 or the second internal electrodes 13, which have the same potential. In other words, the dummy layer 21b does not contribute to the formation of a capacitance.

In the multi-layer ceramic capacitor 10, when a voltage is applied between the first external electrode 14 and the second external electrode 15, electrostriction, which is a mechanical deformation due to a piezoelectric effect, is caused in each capacitance forming layer 21a. In the multi-layer ceramic capacitor 10, the generation of cracks due to the electrostriction of the capacitance forming layer 21a is suppressed, thus achieving an improvement in reliability.

Specifically, in the multi-layer ceramic capacitor 10, suitably adjusting a concentration distribution of manganese (Mn), which is an element having an action of suppressing crystal growth, can effectively suppress the crystal growth in the facing portion 16 during sintering. Accordingly, a decrease in mechanical strength of the facing portion 16 due to grain coarsening is less liable to occur.

Further, in the multi-layer ceramic capacitor 10, if the dummy layer 21b is disposed at a suitable position in the facing portion 16, the following configuration can be provided: electrostriction does not occur at a portion of the facing portion 16, at which coarse crystal grains are liable to be generated. This configuration can suppress generation of cracks in the facing portion 16.

In such a manner, in the multi-layer ceramic capacitor 10, the configuration using in combination a suitable concentration distribution of manganese in the facing portion 16 and a suitable arrangement of the dummy layers 21b can effectively suppress the generation of cracks in the facing portion 16. Hereinafter, a detailed configuration of the facing portion 16 in the multi-layer ceramic capacitor 10 will be described.

2. Detailed Configuration of Facing Portion 16

2.1 Concentration Distribution of Manganese

Figure 4:
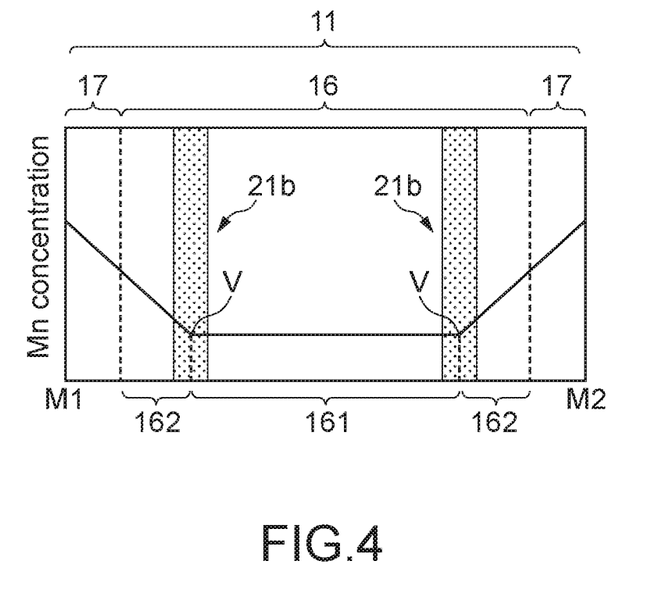
FIG. 4 is a schematic diagram showing a concentration distribution of manganese in a ceramic body of the multi-layer ceramic capacitor.

FIG. 4 is a graph schematically showing a concentration distribution of manganese in the ceramic body 11. The horizontal axis of FIG. 4 represents a position between the main surface M1 and the main surface M2 of the ceramic body 11 along the Z-axis direction. The vertical axis of FIG. 4 represents the concentration of manganese at each positon of the ceramic body 11.

The facing portion 16 includes a first region 161 and second regions 162. The first region 161 and each second region 162 have different concentration distributions of manganese. The first region 161 is positioned at the center of the facing portion 16 in the Z-axis direction. The second regions 162 are positioned on both sides of the first region 161 in the Z-axis direction, that is, each disposed between one of the two covers 17 and the first region 161.

As shown in FIG. 4, the concentration distribution of manganese in the ceramic body 11 takes a bowl-shaped curved line with the first region 161 being as the bottom. In other words, the concentration distribution of manganese in the ceramic body 11 is flat in the first region 161 and is inclined to increase from the first region 161 toward the main surfaces M1 and M2 in the second regions 162 and the covers 17.

It should be noted that the first region 161 has a flat (uniform) concentration distribution of manganese, but the first region 161 does not necessarily have a perfectly constant concentration of manganese. If the concentration of manganese falls within the range of ±3 times the standard deviation of the concentration of manganese with respect to a mean value of the concentration of manganese over the entire first region 161, the concentration distribution of manganese can be considered to be flat (uniform).

The first region 161, which is positioned inside the facing portion 16 in the Z-axis direction, is less susceptible to an action of promoting crystal growth due to heat during sintering, and thus coarse crystal grains are less liable to be generated in the first region 161. Therefore, the first region 161 does not contain manganese to be used to suppress the crystal growth, whereas the first region 161 contains manganese with an amount necessary for securing various physical properties.

Meanwhile, in each of the second regions 162, a part closer to the cover 17 located outward in the Z-axis direction is more susceptible to the action of promoting crystal growth due to heat during sintering. Thus, in the second region 162, the concentration of manganese is increased toward the cover 17 to enhance the action of suppressing crystal growth, which cancels out the action of promoting crystal growth due to heat during sintering.

In such a manner, in the facing portion 16, the concentration distribution of manganese is adjusted as described above, and thus grain coarsening can be effectively suppressed while suppressing a decrease in capacitance due to the presence of manganese used for suppressing the crystal growth. Accordingly, in the multi-layer ceramic capacitor 10, the capacitance can be ensured, and the reliability can also be improved.

2.2 Position of Dummy Layer 21b

FIG. 4 shows boundaries V, each of which defines the interface between the first region 161 and the second region 162 in the facing portion 16. In other words, in the facing portion 16, the first region 161 having a flat concentration distribution of manganese and the second region 162 having an inclined concentration distribution of manganese are switched at the boundaries V.

The inventors of this application found that coarse crystal grains are liable to be generated in the vicinity of each boundary V of the facing portion 16. This reveals that a unique phenomenon, in which crystal grains are more likely to be coarse during sintering, occurs in the vicinity of each boundary V at which the presence or absence of the action of suppressing crystal growth due to manganese is switched.

In this regard, in the multi-layer ceramic capacitor 10, the dummy layers 21b are disposed according to the positions of the boundaries V in the facing portion 16. In other words, in the multi-layer ceramic capacitor 10, as indicated by dot patterns in FIG. 4, each dummy layer 21b is disposed across the first region 161 and the second region 162 in the facing portion 16.

Accordingly, in the multi-layer ceramic capacitor 10, even if a voltage is applied between the first and second external electrodes 14 and 15, electrostriction does not occur in the vicinity of the boundary V at which the dummy layer 21b is disposed. Thus, even if coarse crystal grains are present in the vicinity of the boundary V at which the dummy layer 21b is disposed, cracks are less liable to be generated there.

Figure 5:
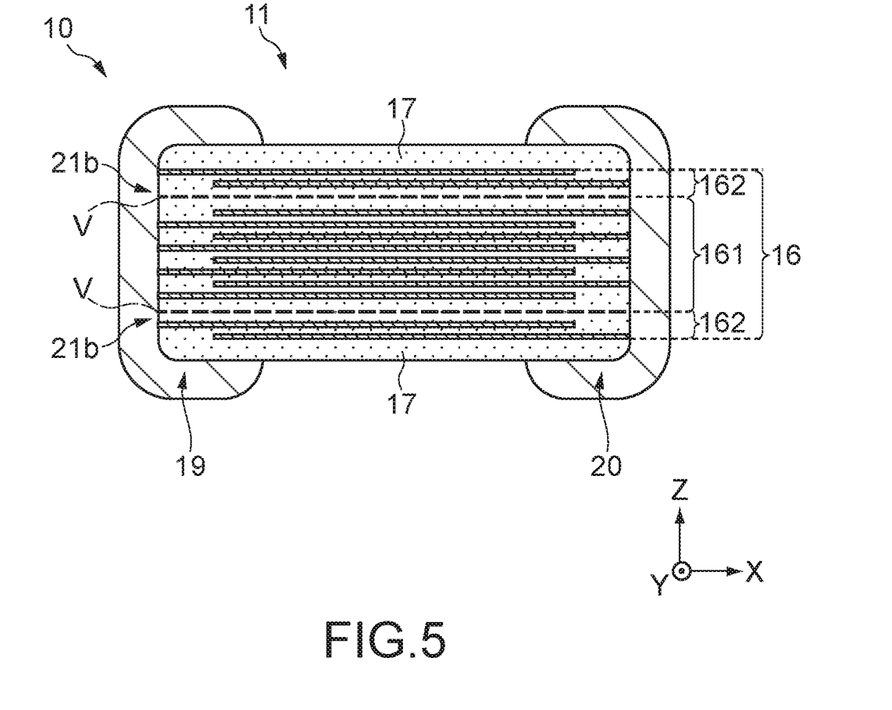
FIG. 5 is a cross-sectional view showing an example of a configuration of a facing portion of the ceramic body.

FIG. 5 is a cross-sectional view showing an example of the configuration of the facing portion 16. FIG. 5 shows, by broken lines, the boundaries V between the first region 161 and each of the second regions 162 in the facing portion 16. In the configuration shown in FIG. 5, the boundaries V extend along the X-Y plane in the respective dummy layers 21b. In other words, the entire region of the boundary V is the dummy layer 21b to which no voltage is applied.

In the configuration shown in FIG. 5, electrostriction does not occur over the entire region of the boundary V, and thus the generation of cracks in the facing portion 16 can be particularly effectively suppressed. In the multi-layer ceramic capacitor 10, however, the generation of cracks due to electrostriction can be suppressed as long as at least part of the boundary V is the dummy layer 21b.

Figure 6:
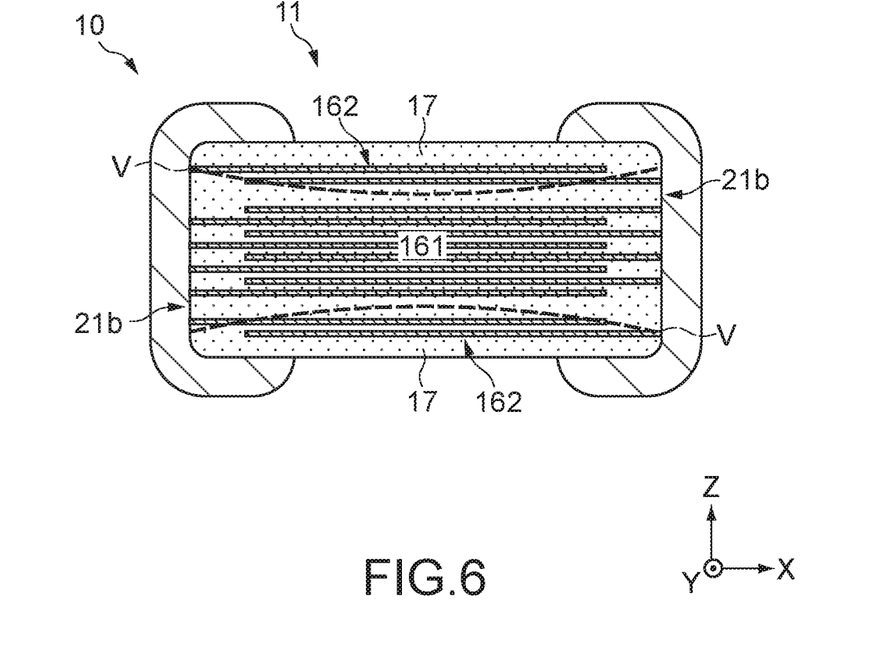
FIG. 6 is a cross-sectional view showing an example of the configuration of the facing portion of the ceramic body.
Figure 7:
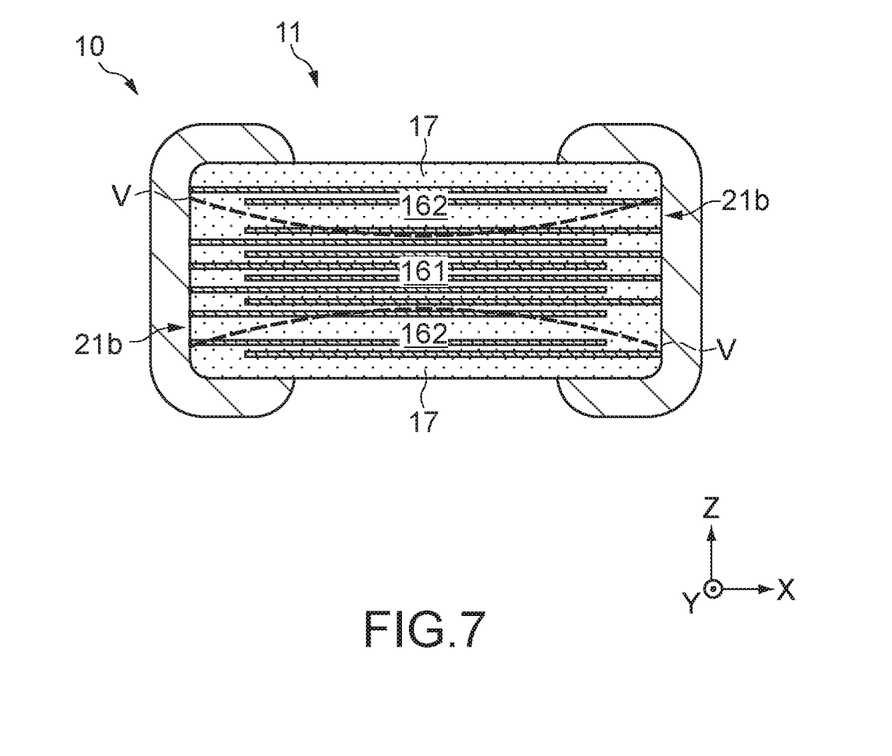
FIG. 7 is a cross-sectional view showing an example of the configuration of the facing portion of the ceramic body.

For example, as shown in FIGS. 6 and 7, in a case where each boundary V is a curved surface curved in the Z-axis direction, it is difficult to form the dummy layer 21b over the entire region of the boundary V. In this case, only the center region of the boundary V can be set to the dummy layer 21b as shown in FIG. 6. Alternatively, only the outer region of the boundary V can be set to the dummy layer 21b as shown in FIG. 7.

In the multi-layer ceramic capacitor 10, in order to effectively suppress the generation of cracks, the dimension of the dummy layer 21b in the Z-axis direction is favorably larger than the dimension of the capacitance forming layer 21a in the Z-axis direction, and is also favorably 5 µm or more. Further, in order to suppress a decrease in capacitance, the dimension of the dummy layer 21b in the Z-axis direction, which does not contribute to the formation of a capacitance, is favorably set to 10 µm or less.

2.3 Method of Determining Boundary V

The boundary V between the first region 161 and the second region 162 in the facing portion 16 can be determined on the basis of the concentration distribution of manganese on a cross section of the facing portion 16. The concentration of manganese on a cross section of the facing portion 16 is obtained by a quantitative measurement using an electron probe micro analyzer (EPMA).

More specifically, in this embodiment, the concentration of manganese is measured, for a vertical cross section parallel to the Z axis of the ceramic body 11, at an equal interval of 1 µm to 5 µm along a straight line passing through the facing portion 16 and being parallel to the Z axis. From results of the measurement, a graph showing the concentration of manganese plotted at each position of the facing portion 16 along the Z-axis direction is created.

Figure 8:
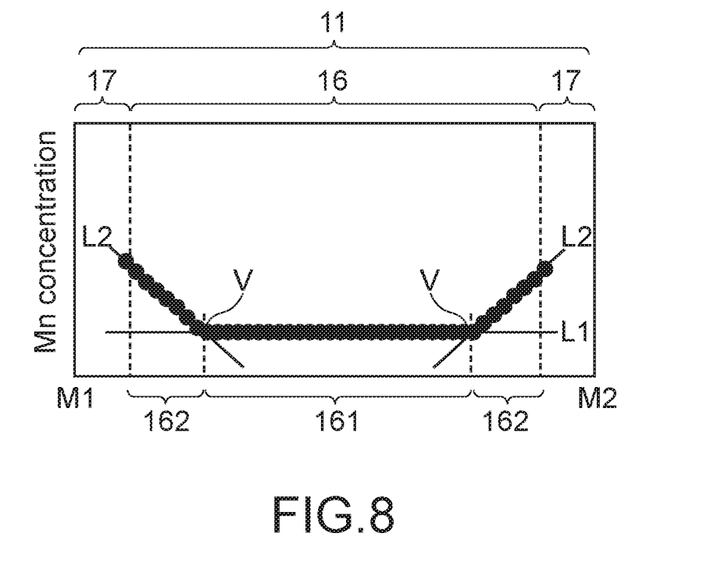
FIG. 8 is a graph showing an example of a concentration distribution of manganese in the facing portion of the ceramic body.

FIG. 8 is a graph showing an example of the concentration distribution of manganese in the facing portion 16 as obtained above. The boundaries V can be determined on the basis of the plotting on the graph. Typically, each of the boundaries V is obtained as an intersection between an approximate straight line L1 of the plotting of the first region 161 and an approximate straight line L2 of the plotting of the second region 162.

Figure 9:
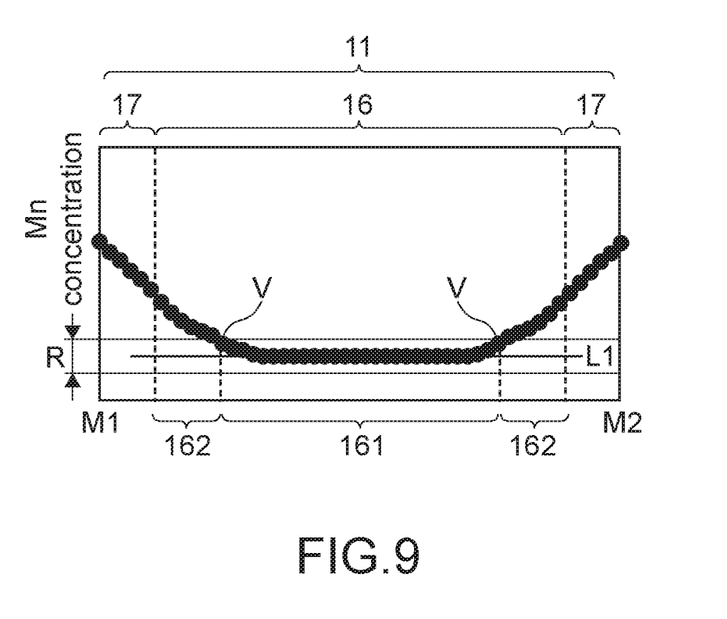
FIG. 9 is a graph showing an example of a concentration distribution of manganese in the facing portion of the ceramic body.

However, in the actual facing portion 16, as shown in FIG. 9, the concentration distribution of manganese in each of the second regions 162 is not linear in some cases. In such a case, the approximate straight line L2 of the plotting of the second region 162 is inaccurate. Thus, in this embodiment, the boundaries V are determined using only the approximate straight line L1 of the plotting of the first region 161.

The approximate straight line L1 is a straight line of a constant concentration of manganese. The approximate straight line L1 can be determined as a mean value of the concentration of manganese plotted in the center region of the facing portion 16 in the Z-axis direction, in which the concentration of manganese is stable (such a center region may be a center region of the three equally divided regions obtained by dividing the facing portion 16 equally into three along the Z-axis direction, for example).

In this embodiment, as shown in FIG. 9, a region, in which the concentration of manganese falls within a range R of ±3 times the standard deviation of the concentration of manganese with respect to the approximate straight line L1, is defined as the first region 161. In other words, in this embodiment, in the sequential plotting of the concentration of manganese within the range R, the outermost positions of the plotting in the Z-axis direction can be determined as the boundaries V. Here, as in the line L1, the standard deviation may be determined on the basis of the concentrations of manganese in the center region among three equally divided regions that are obtained by dividing the facing portion 16 equally to three along the Z-axis direction, for example.

3. Method of Producing Multi-layer Ceramic Capacitor 10

Figure 10:
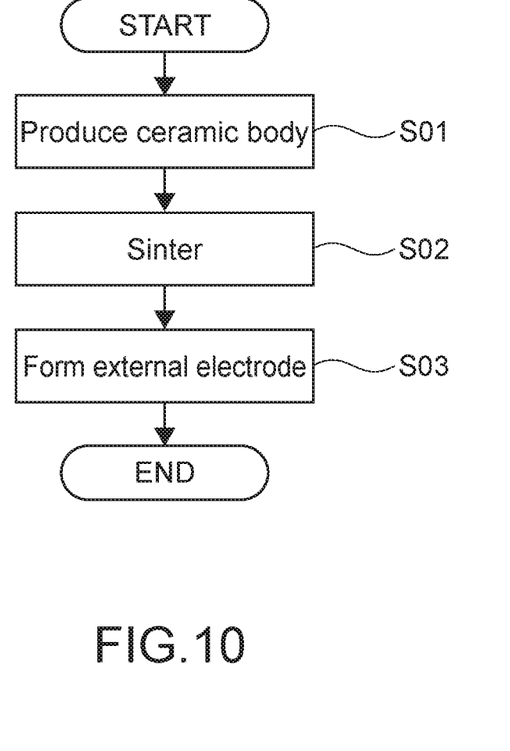
FIG. 10 is a flowchart showing a method of producing the multi-layer ceramic capacitor.
Figure 11:
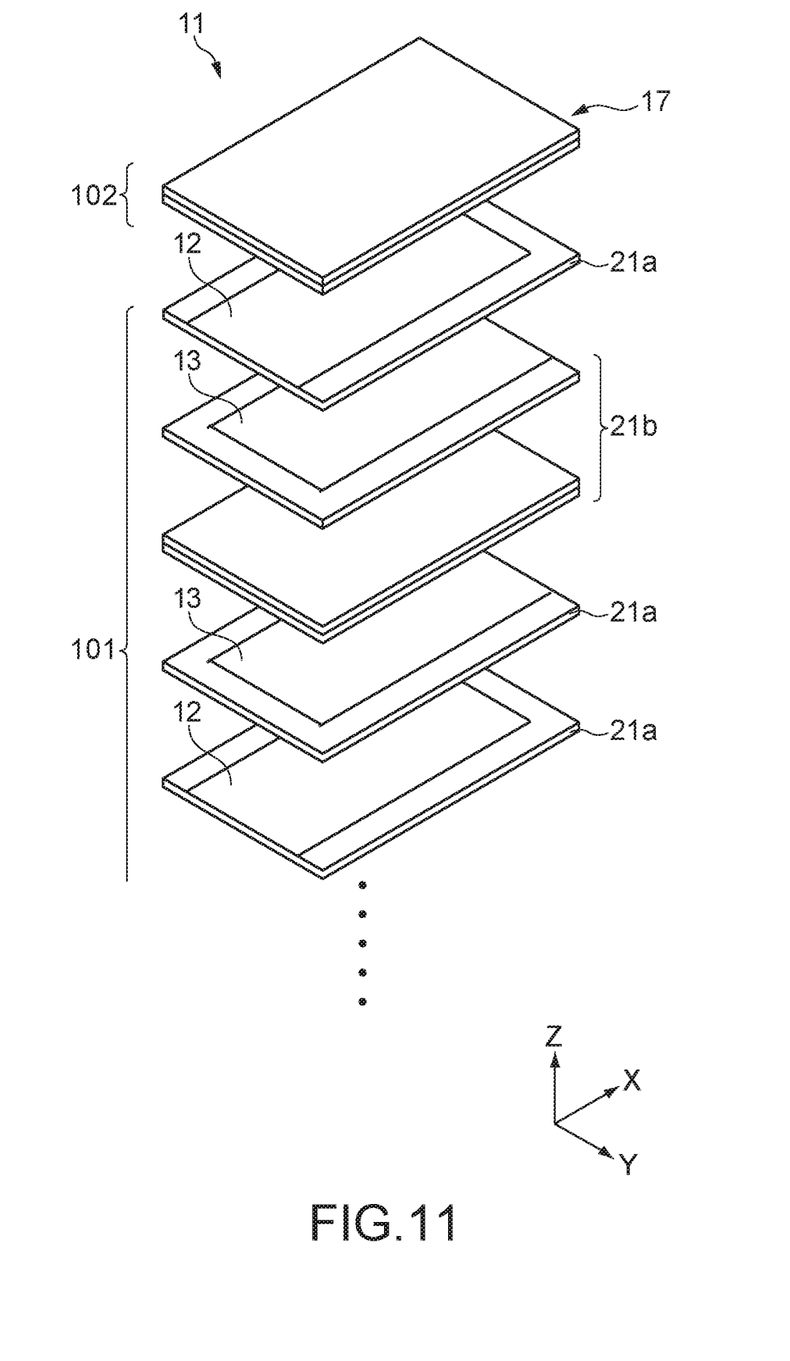
FIG. 11 is a perspective view showing a production process of the multi-layer ceramic capacitor.

FIG. 10 is a flowchart showing a method of producing the multi-layer ceramic capacitor 10 according to this embodiment. FIG. 11 is a perspective view showing a production process of the multi-layer ceramic capacitor 10. Hereinafter, the method of producing the multi-layer ceramic capacitor 10 will be described according to FIG. 10 with reference to FIG. 11 as appropriate.

3.1 Step S01: Production of Ceramic Body

In Step S01, an unsintered ceramic body 11 is produced. The unsintered ceramic body 11 is obtained by laminating a plurality of ceramic sheets in the Z-axis direction as shown in FIG. 11 and pressure-bonding the ceramic sheets. For the plurality of ceramic sheets, two types of ceramic sheets 101 and 102 having different additive amounts of manganese are used.

The ceramic sheets 101 are used to form the facing portion 16, the side margins 18, the first end margin 19, and the second end margin 20 in the ceramic body 11. In other words, the capacitance forming layers 21a and the dummy layers 21b are formed of the ceramic sheets 101. The ceramic sheets 102 are used to form the covers 17 in the ceramic body 11.

In the dummy layer 21b of the ceramic body 11, a plurality of ceramic sheets 101 are disposed in a stack, and thus the dimension of the dummy layer 21b in the Z-axis direction can be set to be larger than the dimension of the capacitance forming layer 21a in the Z-axis direction. It should be noted that the ceramic sheet 101 thicker than the capacitance forming layer 21a may be used to form the dummy layer 21b.

The ceramic sheets 101 and 102 are unsintered dielectric green sheets each obtained by forming ceramic slurry into a sheet shape. The ceramic sheets 101 and 102 are each formed into a sheet shape by using a roll coater or a doctor blade, for example. The thickness of the ceramic sheets 101 and 102 is controllable depending on the conditions of shape forming.

Unsintered first and second internal electrodes 12 and 13 are disposed on the ceramic sheets 101 as necessary. An electrically conductive paste is printed in a pattern, by which the side margins 18, the first end margin 19, and the second end margin 20 are to be suitably formed in the ceramic body 11, and thus the unsintered first and second internal electrodes 12 and 13 can be formed.

The ceramic sheet 102 has a higher concentration of manganese than the concentration of manganese of the ceramic sheet 101. In other words, in the unsintered ceramic body 11, the concentration of manganese is high in only the covers 17, and the concentration of manganese is constant in the capacitance forming layers 21a and the dummy layers 21b that constitute the facing portion 16.

As an example, in a case where barium titanate ($BaTiO_3$) is used as dielectric ceramics of the ceramic sheets 101 and 102, the concentration of manganese with the concentration of titanium being as 100 at % is set to 0.03 at % in the ceramic sheet 101, and to 1.3 at % in the ceramic sheet 102.

It should be noted that the ceramic sheet 101 may contain, other than manganese, for example, with respect to the concentration of titanium of 100 at %, 0.3 at % of dysprosium, 0.3 at % of magnesium, 0.1 at % of vanadium, 0.2 at % of silicon, and 0.001 at % of zirconium.

Further, the ceramic sheet 102 may contain, other than manganese, for example, with respect to the concentration of titanium of 100 at %, 0.9 at % of dysprosium, 1.2 at % of magnesium, 0.2 at % of vanadium, 0.33 at % of silicon, and 0.002 at % zirconium.

3.2 Step S02: Sintering

In Step S02, the unsintered ceramic body 11 obtained in Step S01 is sintered. Accordingly, the ceramic body 11 is sintered. In Step S02, in the course of the process, manganese contained in the ceramic sheets 102 constituting the covers 17 is diffused in the ceramic sheets 101 constituting the facing portion 16.

Accordingly, as shown in FIG. 4, the covers 17 and the second regions 162, in which the concentration of manganese reduces from the main surfaces M1 and M2 toward the first region 161, can be formed. In Step S02, the manganese diffused from the ceramic sheets 102 to the ceramic sheets 101 suppresses crystal growth in the second regions 162 of the facing portion 16.

3.3 Step S03: Formation of External Electrodes

In Step S03, the first external electrode 14 and the second external electrode 15 are formed on the ceramic body 11 obtained in Step S02, to thus produce the multi-layer ceramic capacitor 10 shown in FIGS. 1 to 3. In Step S03, for example, base films, intermediate films, and surface films that constitute the first and second external electrodes 14 and 15 are formed on the end surfaces E1 and E2 of the ceramic body 11.

More specifically, in Step S03, an unsintered electrode material is first applied so as to cover both the end surfaces E1 and E2 of the ceramic body 11. The applied unsintered electrode materials are subjected to baking in a reduction atmosphere or a low-oxygen partial pressure atmosphere, for example, to thus form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S03 described above may be performed before Step S02. For example, before Step S02, the unsintered electrode material may be applied to both the end surfaces E1 and E2 of the unsintered ceramic body 11. Accordingly, sintering of the unsintered ceramic body 111 and baking of the electrode material can be simultaneously performed in Step S02.

4. Other Embodiments

Hereinabove, the embodiment of the present disclosure has been described, but the present disclosure is not limited to the embodiment described above, and it should be appreciated that the present disclosure may be variously modified.

For example, for the element that suppresses the crystal growth of the facing portion 16, a rare-earth element and magnesium (Mg) can be used other than manganese. In other words, in this embodiment, the concentration distribution of at least one of manganese, a rare-earth element, or magnesium only needs to be configured as described above. Examples of the rare-earth element include dysprosium (Dy), holmium (Ho), erbium (Er), and ytterbium (Yb).

Further, it is favorable for the facing portion 16 to include the second regions 162 at positions respectively adjacent to the two covers 17, but the second regions 162 may be provided at only a position adjacent to one of the covers 17 as necessary. In this case, the facing portion 16 can be configured to include a single dummy layer 21b.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-layer ceramic capacitor, comprising:
a ceramic body including:
ceramic layers laminated in a first direction,
first internal electrodes and second internal electrodes that are disposed between the ceramic layers,
a facing portion that is defined as a portion of the ceramic body in which the first internal electrodes and the second internal electrodes overlap with each other, as seen in the first direction,
a first end surface to which the first internal electrodes are drawn from the facing portion,
a second end surface to which the second internal electrodes are drawn from the facing portion, and
a cover that covers the facing portion in the first direction;
a first external electrode that covers the first end surface so as to be in contact with ends of the first internal electrodes drawn to the first end surface; and
a second external electrode that covers the second end surface so as to be in contact with ends of the second internal electrodes drawn to the second end surface,
wherein the facing portion includes:
a first region including at least one element among manganese, a rare-earth element, and magnesium, and having a flat distribution of a concentration of the at least one element along the first direction, and
a second region disposed between the cover and the first region and having an increasing concentration of the at least one element from the first region toward the cover,
wherein at least two of the first or second internal electrodes are consecutively laminated in the first direction and at least some of the other first and second internal electrodes are alternately laminated in the first direction so that the ceramic layers in the facing portion of the ceramic body include:
a ceramic layer sandwiched between the first internal electrode and the second internal electrode in the facing portion, constituting a capacitance forming layer forming a capacitance between the first external electrode and the second external electrode; and
a ceramic layer sandwiched between the two of first or second internal electrodes that are consecutively laminated in the facing portion, constituting a dummy layer that does not form a capacitance between the first external electrode and the second external electrode, and
wherein at least a portion of a boundary between the first region and the second region is positioned within the dummy layer that are sandwiched by the two of first or second internal electrodes that are consecutively laminated.

2. The multi-layer ceramic capacitor according to claim 1, wherein a dimension of the dummy layer in the first direction is larger than a dimension of the capacitance forming layer in the first direction.

3. The multi-layer ceramic capacitor according to claim 1, wherein a dimension of the dummy layer in the first direction is 5 µm or more and 10 µm or less.

4. The multi-layer ceramic capacitor according to claim 1, wherein:
the cover is provided in a pair, the pair of covers being disposed on both sides of the facing portion in the first direction,
the second region is provided in a pair, each one of the pair of second regions being disposed between a corresponding one of the pair of covers and the first region, and
the dummy layer is provided in a pair, each one of the pair of dummy layers extending across the first region and a corresponding one of the pair of second regions.

5. The multi-layer ceramic capacitor according to claim 1, wherein the boundary between the first region and the second region is positioned entirely within the dummy layer that are sandwiched by the two of first or second internal electrodes that are consecutively laminated.

* * * * *